(12) United States Patent
Wigren et al.

(10) Patent No.: US 8,385,948 B2
(45) Date of Patent: Feb. 26, 2013

(54) METHOD AND ARRANGEMENT FOR IMPROVED POSITIONING

(75) Inventors: Karl Torbjörn Wigren, Uppsala (SE); Bo Hellander, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3 days.

(21) Appl. No.: 13/140,672

(22) PCT Filed: Dec. 18, 2008

(86) PCT No.: PCT/SE2008/051512
§ 371 (c)(1),
(2), (4) Date: Sep. 2, 2011

(87) PCT Pub. No.: WO2010/071518
PCT Pub. Date: Jun. 24, 2010

(65) Prior Publication Data
US 2011/0306355 A1  Dec. 15, 2011

(51) Int. Cl.
*H04Q 7/20* (2006.01)
(52) U.S. Cl. .................. 455/457; 455/456.5; 455/456.1; 342/357.2
(58) Field of Classification Search .................. 455/457, 455/456.5, 456.1; 342/357.2
See application file for complete search history.

(56) References Cited

U.S. PATENT DOCUMENTS

| | | | |
|---|---|---|---|
| 6,549,781 B1 * | 4/2003 | O'Byrne et al. | 455/446 |
| 6,768,994 B1 * | 7/2004 | Howard et al. | 1/1 |
| 2003/0109267 A1 * | 6/2003 | Bulut | 455/457 |
| 2003/0117316 A1 * | 6/2003 | Tischer | 342/357.1 |
| 2003/0216142 A1 * | 11/2003 | Wigren | 455/456.1 |
| 2010/0075696 A1 * | 3/2010 | Wigren | 455/456.1 |

(Continued)

FOREIGN PATENT DOCUMENTS

WO  2004/019650 A1  3/2004

OTHER PUBLICATIONS

3RD Generation Partnership Project. "Positioning Reporting Inconsistencies." TSG-RAN Working Group 3 Meeting #44, Tdoc R3-041332, Sophia Antipolis, France, Oct. 4-8, 2004.

(Continued)

*Primary Examiner* — Danh Le
(74) *Attorney, Agent, or Firm* — Coats & Bennett, P.L.L.C.

(57) ABSTRACT

In a method of improved positioning of user equipments in a telecommunication system comprising at least one user equipment in communication with a core network node via a radio access network node, in response to a user equipment positioning event for said at least one user equipment performing the following steps. Providing S10 user equipment identification data in the core network node for each at least one user equipment, the data comprising at least a parameter indicative of a type for the user equipment, a confidence reporting principle, a geographical reporting format type, and a positioning method, associated with said user equipment type. Providing S20 positioning information in the core network node from the radio access network node based on the positioning event. The positioning information comprising a geographical format representative of the geographic position of the user equipment, and a positioning method applied in at least the radio network node. Subsequently, determining S30 the type of the at least one user equipment, from information signaled to the core network node. Finally, correcting/adapting S40 the provided positioning information based on the provided user equipment identification data, a predetermined desired output geographical format, the determined user equipment type and the applied positioning method, whereby an improved positioning for the user equipment is enabled in the core network node.

18 Claims, 6 Drawing Sheets

U.S. PATENT DOCUMENTS

2010/0109952 A1* 5/2010 Wigren et al. .............. 342/451

OTHER PUBLICATIONS

European Telecommunications Standards Institute. ETSI TS 123 032, V7.0.0 (Jun. 2007). Digital cellular telecommunications systems (Phase 2+); Universal Mobile Telecommunications System (UMTS); Universal Geographical Area Description (GAD) (3GPP TS 23.032 version 7.0.0 Release 7). Jun. 2007.

3RD Generation Partnership Project. "Positioning Reporting Inconsistencies." 3GPP TSG RAN WG2 Meeting #53, Tdoc R2-061391, Shanghai, China, May 8-12, 2006.

* cited by examiner

METHOD AND ARRANGEMENT FOR IMPROVED POSITIONING

TECHNICAL FIELD

The present invention concerns telecommunication systems in general, specifically methods and arrangements for providing improved positioning of user equipment in such systems.

BACKGROUND

In telecommunication systems, e.g. WCDMA, geographical positions of a user equipment (UE) are sometimes determined by the UE itself. One typical example is where the UE is equipped with a GPS receiver and so-called UE based assisted GPS (A-GPS) positioning is used. In this case, the UE may report its geographical (longitude, latitude and potentially altitude) location using one of five geographical formats [1]. Some of these formats come with uncertainty information that defines a region around the reported point, where the UE is located. These uncertainty measures are all statistical. Consequently, there is a certain probability ("confidence") that the UE is actually to be found within the reported uncertainty region [1]. The crucial point is that the confidence is closely associated with the size of the reported region. In general, if a higher confidence is preferred at the receiving end, the size of the region needs to be scaled up and vice versa. This scaling is one of the modes in which the geographical shape conversions can operate. All this is explained in more detail in the 3GPP standard [1], [2], [3], [4].

The above-mentioned five geographical A-GPS reporting formats, in a present form, comprise three 2-dimensional (2D) formats and two 3-dimensional (3D) formats. One problem with this reporting originates from the fact that the statistical models for the 2D uncertainty ellipse and the 3D uncertainty ellipsoid are associated with different confidence values for the so-called 1-sigma (covariance matrix) confidence level, 39% in the 2D case, and 20% in the 3D case. The present 3GPP standard is unfortunately unclear on whether 2D or 3D confidence shall be associated with the 3D uncertainty ellipsoid.

Consequently, terminal vendors have chosen different alternatives. Since there is no information signaled on the RRC interface (similar in GSM) as to whether a 2D or a 3D confidence is reported, the consequence is that there is an uncertainty of the scaling (size) of the reported uncertainty ellipsoid. Note that the terminal or user equipment may itself have performed a scaling, meaning that the values 39% or 20% need not necessarily be reported.

The consequences of the above hence include that there is a significant risk that the wrong size of the uncertainty region is reported from the Radio Access Network (RAN) to the Core Network (CN) over the Iu interface [4], due to this uncertainty of the standard. This is particularly troublesome for emergency positioning since regulatory requirements may be invalidated and since search and rescue operations may fail. In addition, there are many fielded terminals that report according to the two different alternatives. Since this has chip set impact, the problem is not easily corrected by a standard clarification. Finally, the Radio Access Network (RAN) cannot correct the reported confidence and rescale the uncertainty region, since the information of UE type is not available within the RAN.

Therefore, there is a need for improved positioning of user equipment in the above described systems.

SUMMARY

An aim of the present invention is to provide a solution to the above-described problems.

A further object is to enable improved positioning of user equipment in a telecommunication system.

According to a basic embodiment, a step of correcting or adapting a reported confidence or shape of an uncertainty shape is introduced on the core network side.

More specifically, a method of improved positioning of user equipments in a telecommunication system comprises, in response to a user equipment positioning event for the at least one user equipment, the steps of:

providing user equipment identification data in a core network node for each user equipment, said data comprising at least a parameter indicative of a type for the user equipment, a confidence reporting principle, a geographical reporting format type, and a positioning method associated with the user equipment type;

providing positioning information in the core network node from a radio access network node based on the positioning event, the positioning information comprising a geographical format representative of the geographical position of the user equipment, and a positioning method applied in the radio network controller node;

determining the type of the user equipment, from information signaled to the core network node;

correcting/adapting the provided positioning information based on the provided user equipment identification data, a predetermined desired output geographical format, the determined user equipment type and the applied positioning method, to enable an improved positioning for the user equipment in the core network node.

Advantages of the present invention include:

A correct reporting of positioning uncertainty is achieved, despite ambiguities in the standard. The corrective actions defined resolve the ambiguity in all possible cases.

Diverging implementations of uncertainty reporting in fielded terminals are corrected to the largest possible extent. No modification of terminals is required. No modification of fielded RANs is needed.

The correction is defined in a way that allows for very low complexity implementation in the core network.

BRIEF DESCRIPTION OF THE DRAWINGS

The invention, together with further objects and advantages thereof, may best be understood by referring to the following description taken together with the accompanying drawings, in which.

ABBREVIATIONS

CN Core Network
GSM Global System for Mobile Communication
GPS Global Positioning System
IMEI International Mobile Equipment Identity
MSC Mobile Switching Centre
RAN Radio Access Network
RANAP Radio Access Network Application Part
RNC Radio Network Controller
RNSAP Radio Network Subsystem Application Part
RRC Radio Resource Control
SIM Subscriber Identity Module
UE User Equipment
WCDM Wideband Code Division Multiple Access

DETAILED DESCRIPTION

The present invention will be described in the context of a WCDMA telecommunication system. However, it is evident to the skilled person that the general aspects of the disclosure are applicable in similar systems with the same functionality, e.g. the GSM system and the new LTE system.

Figure 1:
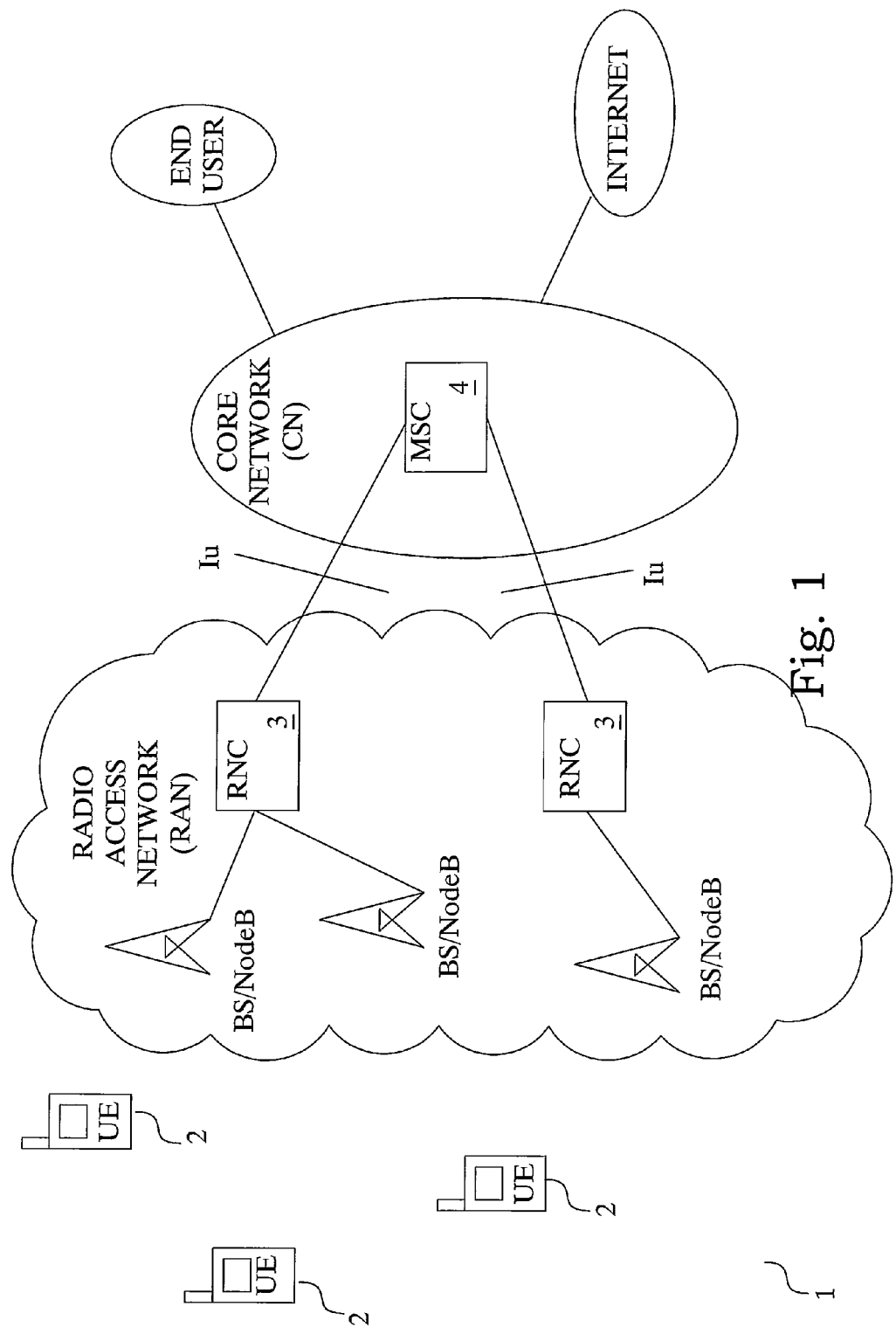
FIG. 1 is an illustration of a general system in which the present invention can be implemented.

With reference to FIG. 1, a system in which the present invention can be implemented is illustrated. The system comprises at least one user equipment UE 2 or terminal, in communication with a core network node CN 4 (e.g. MSC) via a radio access network node RAN 3 e.g a radio network controller node (RNC), preferably across the Iu interface. An end user is also in communication with the core network CN, an example being a emergency location unit. The term user equipment or terminal is used in its most general form, thus including terminals such as mobile phones, handheld computers etc. In a known manner base stations or Node Bs are associated with each RNC A main aspect of the present invention is to introduce a confidence/shape conversion step in the core network CN (e.g. MSC), since the type of the UE is known in the CN. The term type is used in its broadest possible sense. By creation of a list or table in the core network that indicates if a 2D or 3D confidence is reported from the user equipment, it becomes possible to perform a corrective shape conversion step, to rescale the uncertainty shape reported from the RAN on the CN side. The list should preferably contain entries for all different types of UE based A-GPS capable UEs in the network.

To provide some support for the further understanding of the present invention it is convenient to provide a background to the previously mentioned shape converting functionality that is needed in the so-called WCDMA (and LTE) UE Positioning function(s). The present disclosure is focused on A-GPS since the present disclosure concerns the 3D uncertainty shape reported back from the UE in case of UE based A-GPS positioning.

However, it is evident that the same general principles can be adapted for other similar positioning methods in similar systems. As a start, and as already mentioned, the following 5 positioning shapes may be reported from the UE to the radio access network e.g. radio network controller (RNC) over the RRC interface [3], in case of UE based A-GPS positioning (probably similar in GSM):

Ellipsoid point. Horizontal (2D) information only.
Ellipsoid point with uncertainty circle. Horizontal (2D) information only.
Ellipsoid point with uncertainty ellipse. Horizontal (2D) information only.
Ellipsoid point with altitude. Horizontal and vertical (3D) information.
Ellipsoid point with altitude and uncertainty ellipsoid. Horizontal and vertical (3D) information.

It should be noted that the position uncertainty information that accompany reported positions (over RRC [2], RANAP [3] and RNSAP [4]) typically consists of two parts, namely a geometrical shape, e.g. an ellipsoid, whose size reflects the position and its uncertainty, and a confidence value, i.e. the estimated probability that the terminal or user equipment is located within the position uncertainty shape.

The need for conversions between the above geometrical shapes occur in the RAN for a variety of reasons, the two most important ones being the following. Firstly, many emergency positioning centers only accept certain formats. As an example, in the North-American market the accepted format is the point with an uncertainty circle. Secondly, multi-vendor CN IoT issues, i.e. the fact that the supported formats on the RAN and CN sides of the RANAP interface [3] may not be the same. This is sometimes the case also when a single vendor provides both the MSC and the RNC.

As stated previously, the uncertainty region and the confidence are closely coupled or associated, and need to be consistently reported. As an example, an A-GPS terminal is normally able to compute a covariance matrix that forms an estimate of the positioning uncertainty. The covariance matrix can then be transformed, e.g. to a 2-dimensional ellipse. In this case, it is easily shown that the confidence (i.e. the probability that the terminal is located within the ellipse around the reported position) is 39%. In case a 3-dimensional uncertainty ellipsoid is computed from the same data, it can be shown that the associated confidence is 20%.

Figure 2:
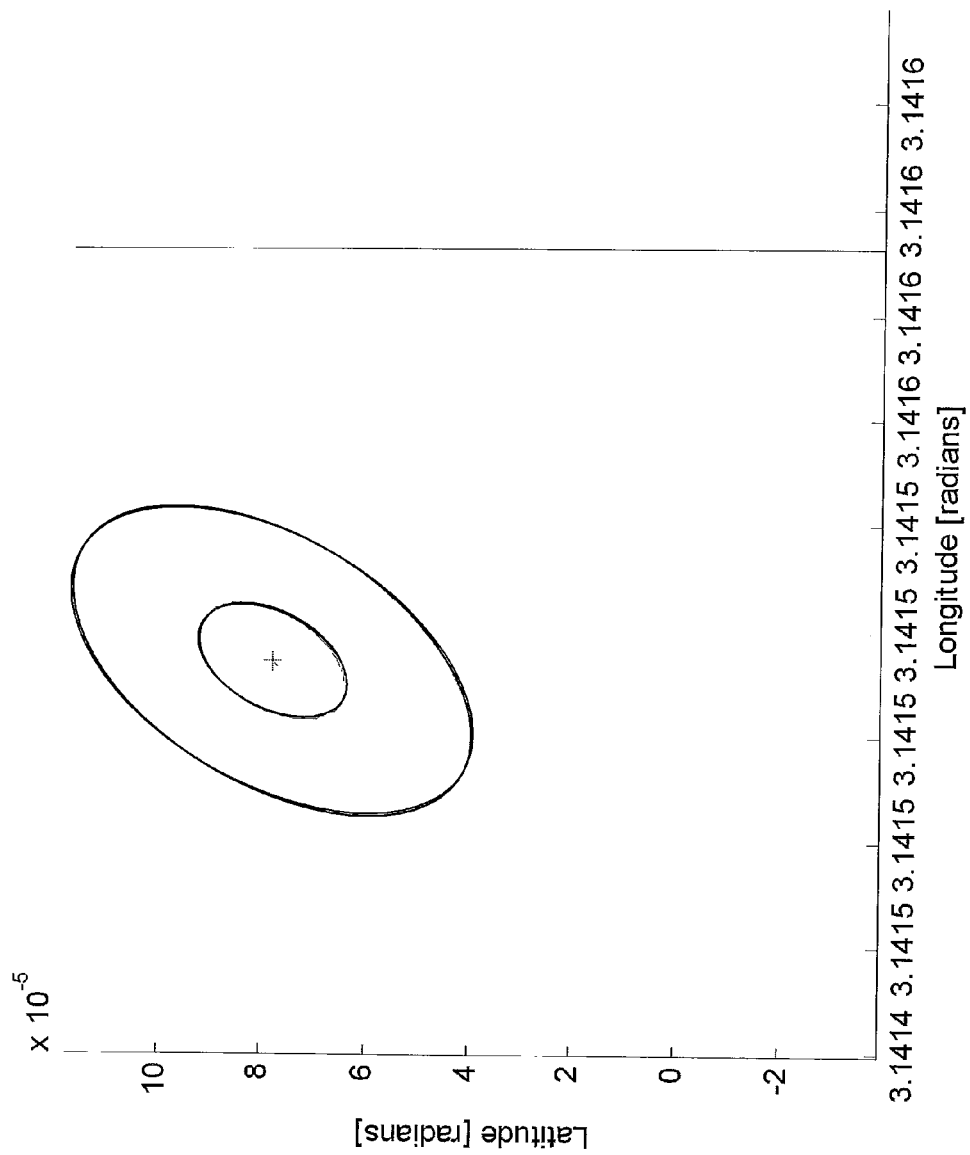
FIG. 2 is a further illustration of the scaling functionality of prior art.
Figure 3:
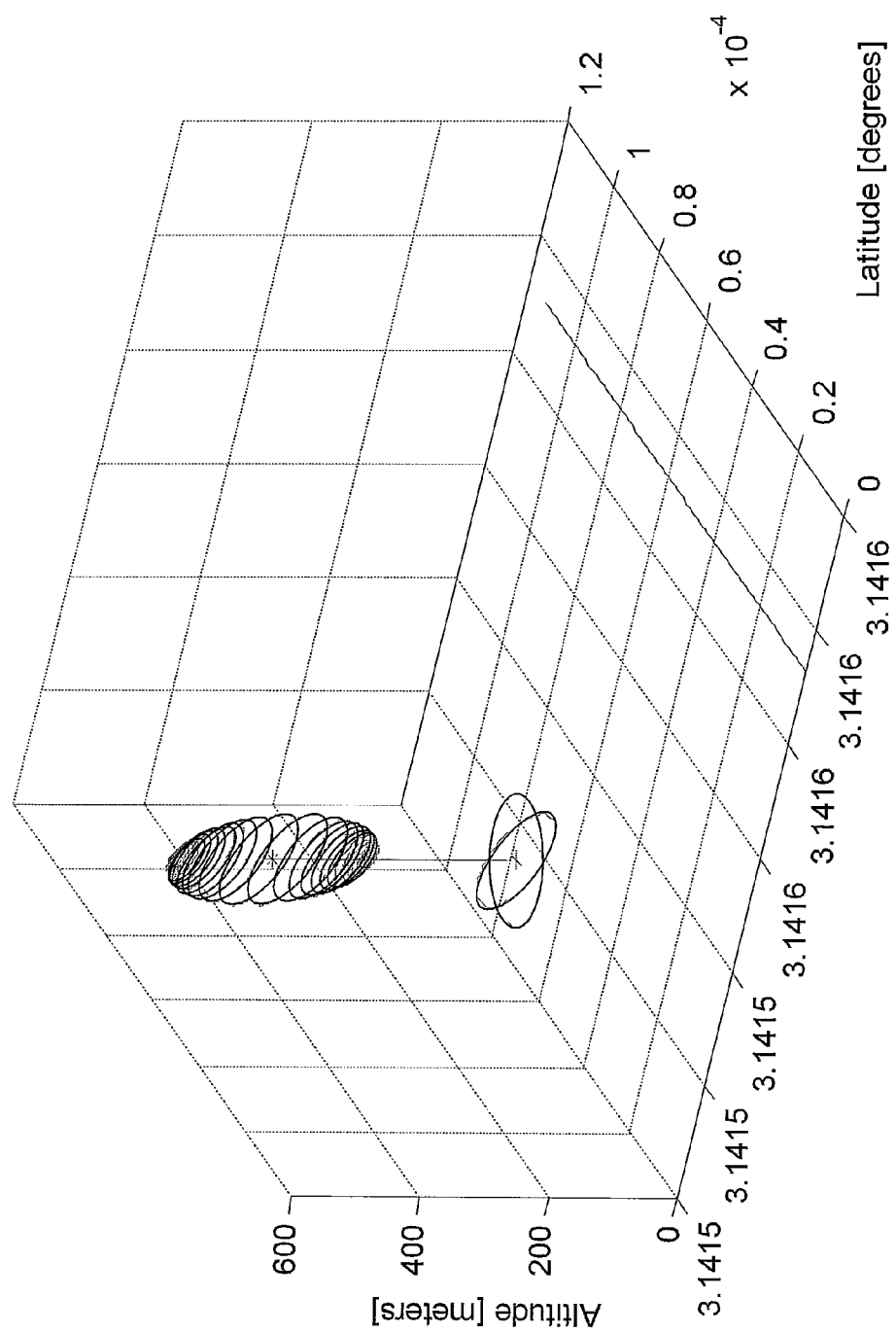
FIG. 3 is a further illustration of the scaling functionality of prior art.
Figure 4:
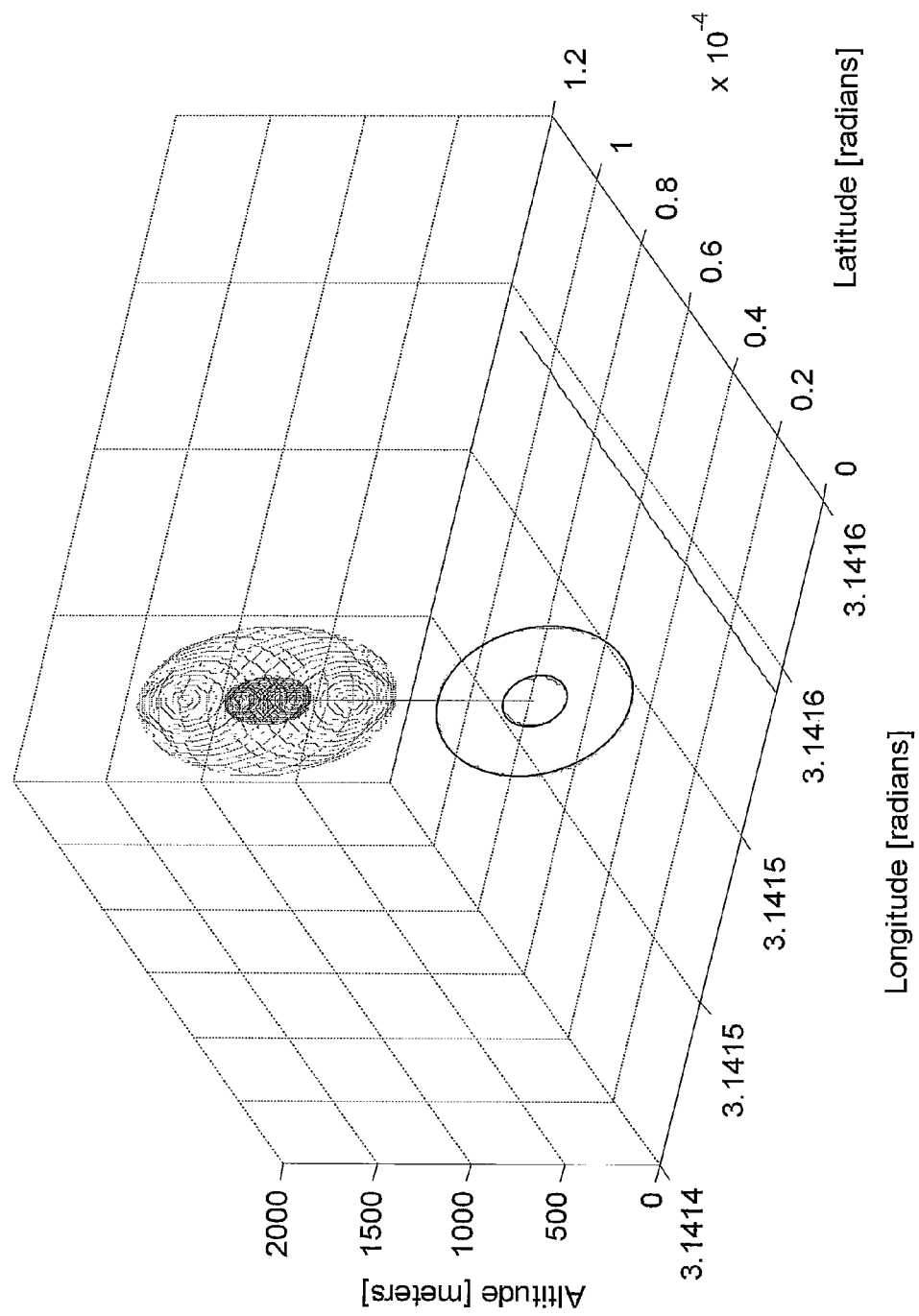
FIG. 4 is an illustration of the scaling functionality of prior art.

It should be noted that a very important aspect of geographical shape conversions is the ability to scale the uncertainty regions from a size corresponding to an obtained input confidence, to another size corresponding to a preferred output confidence. This is illustrated in FIG. 2-FIG. 4 for the geographical shapes that are of interest to the present disclosure. FIG. 2 illustrates the transformation from "Ellipsoid point with uncertainty ellipse" (inner ellipse), to "Ellipsoid with uncertainty ellipse" (outer ellipse). FIG. 3 illustrates the transformation from "Ellipsoid point with altitude and uncertainty ellipsoid", to "Ellipsoid point with uncertainty circle". The transformation to "Ellipsoid point" is obtained by removal of the uncertainty circle of the result. Finally, FIG. 4 illustrates the transformation from "Ellipsoid point with altitude and uncertainty ellipsoid" (inner ellipsoid) to "Ellipsoid point with altitude and uncertainty ellipsoid" (outer ellipsoid). As a support the projected 2D uncertainty ellipses are plotted at zero altitude. The case represents a substantial up-scaling of the confidence.

One key aspect of the present disclosure is the information or knowledge of the type of UE that is performing the positioning. It is well known that this information is not available in the WCDMA RAN (the RNC or the Node B). It is however available in the CN, e.g. in the MSC node. It is a well known behavior of the CN to store information of the UE type, represented by the so called International Mobile Equipment Identity (IMEI), associated with each subscriber in a database. This information is gathered by requesting the IMEI from the UE by means of the so called IDENTITY REQUEST/IDENTITY RESPONSE procedure, see [5], typically in a periodic manner. Since the subscriber can at any time, without the operator noticing, move the SIM card from one UE to another, the stored IMEI information may not be correct at all times. For the purpose of the present disclosure, it is preferable to always request the IMEI from the UE for each positioning attempt or event in order to avoid any mistakes.

Each UE has it's own unique IMEI value why it is possible to identify the appropriate conversion either per individual UE or for a range of IMEI values representing the UEs produced of a certain brand and model.

The origin of the problem addressed by this disclosure, as stated previously, is the fact that the present 3GPP standard does not properly specify the reporting of confidence for UE positioning events. In particular, the standard does not specify whether a confidence value corresponding to the 2-dimensional horizontal parts of the uncertainty ellipsoid of the format 'ellipsoid point with altitude and uncertainty ellipsoid' shall be associated with the complete reported shape, or if a confidence value corresponding to the complete 3-dimensional uncertainty ellipsoid of the format 'ellipsoid point with altitude and uncertainty ellipsoid' shall be associated with the complete reported shape.

As a result, the scaling of said shape becomes uncertain, cf. the values 39% and 20% discussed above.

Some of the consequences of the above-described scenario are that there is a significant risk that the wrong size of the uncertainty region is reported from the RAN to the CN over the Iu interface [3], due to this uncertainty of the standard. This is particularly troublesome for emergency positioning since regulatory requirements may be invalidated and since search and rescue operations may fail. In addition, there are many fielded terminals that report according to the two different alternatives. Since this has chip set impact, the problem is not easily corrected by a standard clarification. Finally, the RAN cannot correct the reported confidence and rescale the uncertainty region, since the information of UE type is not available within the RAN.

Consequently, according to a basic aspect of the present invention, a confidence or shape conversion/correction/adapting step is introduced in the CN e.g. MSC node, since the type of the UE is known in the CN. A list or table or similar tool is created, which states whether a 2D or 3D confidence is reported from the UE to the RAN. Thereby it becomes possible to perform a corrective shape conversion step to rescale the reported uncertainty shape on the CN side. The list preferably contains entries for all different types of UE based A-GPS capable UEs in the network.

The present invention typically requires at least the following novel entities or features in the CN node where the corrections are to be performed.

Firstly, a table, where the reporting from the UE of confidence for the geographical shape 'Ellipsoid Point with Altitude and Uncertainty Ellipsoid' is recorded, as a function of the positioning method, the UE type and the 2D/3D assumption of the shape conversion of the RAN. The latter quantity refers to the assumption made by the RAN, as to whether a 2D or 3D confidence value is assumed. Note that only UEs that are known to always report 1-sigma values can be handled—the reason is that in case the RAN is allowed to modify the confidence by a shape conversion, there is no way to know the value of the confidence reported by the UE to the RAN, on the CN side. Note that 1-sigma reporting appears to be the case for a significant number of UEs. Note also that the procedure could be extended to cover erroneous 1D 1-sigma reporting. That would however be standard violating and is not considered here. Note also that in case the RAN does not perform scaling and/or confidence modification, a special case applies. Finally note that in case it is known that something other than 1-sigma reporting is always applied, then special actions may be taken for that particular UE type.

Secondly, a configurable parameter indicating if the desired end user Confidence reporting should be 2-dimensional or 3-dimensional.

Thirdly, a parameter indicating whether the RAN node performs confidence modifying shape conversions or not.

Note that the RAN node normally reports according to a desired confidence value of the end user, hence the applied corrections are normally applied by a rescaling of the reported shape. The other alternative where the shape is held constant is another possibility. Both embodiments will be described in detail below. The table and the parameters may e.g. be managed by manual configuration, or by some automatic configuration or a combination of both.

Figure 5:
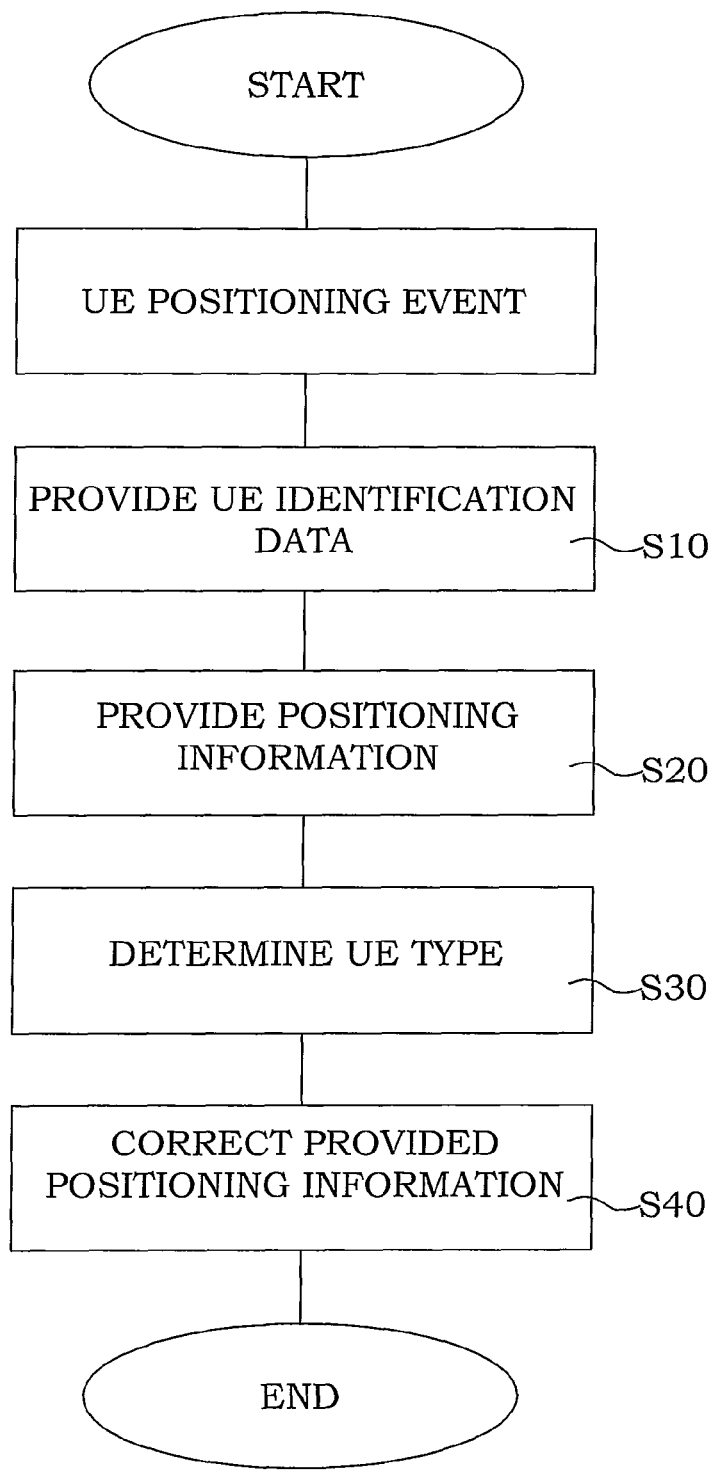
FIG. 5 is an example of an embodiment of a method according to the present invention.

With reference to FIG. 5, the following basic steps of an embodiment of a method according to the present invention are then followed whenever a UE Positioning attempt or event occurs.

In response to a user equipment positioning event for the at least one user equipment UE the following steps are executed. User equipment identification data is provided S10 in the core network node for each at least one user equipment. The data comprising at least a parameter that indicates a type for the user equipment, for each type at least a geographical reporting format associated with the type, the confidence reporting principle (2D/3D) used by the UE for reporting to the RAN, and the positioning method. The data is needs to be configured in the core network node, where it is stored in a table.

Subsequently, providing S20 positioning information in the core network node from the RAN node based on the positioning event. The positioning information typically comprises a geographical format representative of the geographical position of the user equipment, and a positioning method applied in the radio network controller node. The RAN node may either use measurements from the UE in order to estimate the geographical format, or forward a geographical format from the UE to the CN. In both cases a shape conversion step may be performed.

Thereafter, determining S30 the type of the user equipment based on information signaled to the core network node.

Finally, correcting/adapting S40 the provided positioning information based on the provided user equipment identification data, a predetermined desired output geographical format, the determined user equipment type and the applied positioning method, whereby an improved positioning for the user equipment is enabled in the core network node.

Below a description of the procedure from a more focused CN view is provided.

i) The CN node receives the message with the reported geographical format from the RAN node e.g. RNC node.
ii) The CN node determines if the reporting format is 'Ellipsoid Point with Altitude and Uncertainty Ellipsoid'. If this is not the case the procedure is terminated, otherwise the procedure continues with step iii).
iii) The CN node checks the 'POSITION DATA' IE and determines which positioning method that has been applied.
iv) The CN node looks up the confidence property of the table. In case no entry is available for the UE in question, the procedure terminates. Otherwise, the procedure proceeds with step v).
v) In case the applied Confidence computation is the same as the desired Confidence reporting method, the procedure is terminated, otherwise the procedure continues with step vi).
vi) A shape transformation is applied to re-scale the uncertainty ellipsoid to be consistent with the desired confidence reporting. These steps are discussed in the next section. See subsequent sections for details on the transformations.

For each positioning request, the CN also typically requests the previously mentioned IMEI (or similar information) from the UE by means of the so-called IDENTITY REQUEST/IDENTITY RESPONSE procedure, see [6]. The IMEI value received constitutes the identification of one specific UE individual where all UEs of the same type have IMEI values within a specific value range as defined by each UE manufacturer. The exact confidence computation needed for each individual UE or, preferably, for each group of UEs can then be defined.

Below a detailed description of various embodiments of the specifics of the corrective/adaptive step S40 in the CN node will be described. The corrective action can be divided into two main categories. Namely, the case where confidence modifying shape conversion is performed in the RAN and the case where the confidence is kept constant in the RAN.

For illustrative purposes, a couple of exemplary equations will be used to show a possible way of correcting the reported confidence. However, it is evident that the present invention is not limited to the specifics of the equations mentioned.

In case a 2D confidence has been used in the UE, this confidence being consistent with the size of the 2D parts of the uncertainty ellipsoid, the following transformation transforms the decoded semi-major axis a', the semi-minor axis b' and the uncertainty altitude h', to the values corresponding to the 2D 1-sigma value, given the confidence $P_e$.

$$a = a'/\sqrt{-2\ln(1-P_e)}, \ b = b'/\sqrt{-2\ln(1-P_e)}, \ h = h'/\sqrt{-2\ln(1-P_e)} \quad (1)$$

This one sigma value is then also the 1-sigma value for the 3D ellipsoid. The inverse of this transformation is trivial to obtain. Here a is the semi-major axis, b is the semi minor axis and h is the altitude.

In addition, a similar case as above is described, this time assuming 3D confidence reporting. The difference is that no formula for the transformation exists; rather a pre-computed look up table (see Table 1 below) is used. Interpolation in this table may be used to enhance the resolution further.

The 3D input confidence is tabulated in the left column. The corresponding scale factor to divide with, to achieve 1-sigma scaling of the semi major axis, the semi-minor axis, and the uncertainty altitude, appears in the right column. Hence, the formulas are (after using the given confidence to do a table look up/interpolation):

$$a = a'/\text{scaleFactor3D}, \ b = b'/\text{scaleFactor3D}, \ h = h'/\text{scaleFactor3D}. \quad (2)$$

TABLE 1

| confidence3D(i), i := 1, ..., 32 | scaleFactor3D(i) i := 1, ..., 32 |
|---|---|
| 0.0041 | 0.2512 |
| 0.0054 | 0.2746 |
| 0.0070 | 0.3002 |
| 0.0091 | 0.3282 |
| 0.0118 | 0.3588 |
| 0.0153 | 0.3922 |
| 0.0199 | 0.4288 |
| 0.0257 | 0.4688 |
| 0.0331 | 0.5125 |
| 0.0426 | 0.5603 |
| 0.0547 | 0.6125 |
| 0.0699 | 0.6696 |
| 0.0890 | 0.7320 |
| 0.1129 | 0.8003 |
| 0.1423 | 0.8749 |

TABLE 1-continued

| confidence3D(i), i := 1, ..., 32 | scaleFactor3D(i) i := 1, ..., 32 |
|---|---|
| 0.1781 | 0.9564 |
| 0.2213 | 1.0456 |
| 0.2724 | 1.1430 |
| 0.3319 | 1.2496 |
| 0.3994 | 1.3661 |
| 0.4740 | 1.4935 |
| 0.5539 | 1.6327 |
| 0.6362 | 1.7849 |
| 0.7170 | 1.9513 |
| 0.7922 | 2.1332 |
| 0.8576 | 2.3321 |
| 0.9103 | 2.5495 |
| 0.9489 | 2.7872 |
| 0.9743 | 3.0470 |
| 0.9888 | 3.3310 |
| 0.9959 | 3.6416 |
| 0.9988 | 3.9811 |

Firstly, the case where the RAN performs confidence modifying shape conversions is treated. A plurality of combinations of UE information, RAN actions, and desired reporting confidence will be described.

a) The UE reports a 2D Confidence and an uncertainty ellipsoid scaled so that the 2D parts are consistent with the Confidence value. The RAN assumes a 2D confidence reporting from the UE. A desired 2D confidence is configured in the CN. No corrective action is necessary.

b) The UE reports a 2D Confidence and an uncertainty ellipsoid scaled so that the 2D parts are consistent with the Confidence value. The RAN assumes a 2D confidence reporting from the UE. A desired 3D confidence is configured in the CN. Consequently, the size of the uncertainty ellipse is transformed to be consistent with a 3D value. First Equation (1) is applied to achieve a 1-sigma uncertainty ellipsoid using the reported confidence value. Then Equation (2) is applied backwards to scale the 1-sigma ellipsoid according to the desired confidence value received in the CN.

c) The UE reports a 2D Confidence and an uncertainty ellipsoid scaled so that the 2D parts are consistent with the Confidence value. The RAN assumes a 3D confidence reporting from the UE. A desired 2D confidence is configured in the CN. The size of the uncertainty ellipse is transformed to be consistent with a 2D value. First Equation (2) is applied to revert the last step of the RAN transformation. Then Equation (2) is applied backwards to revert the first step of the RAN transformation using the (known) received confidence in the RAN from the UE (39% since 2D). Then Equation (1) is applied backwards to scale the 1-sigma ellipsoid according to the confidence value.

d) The UE reports a 2D Confidence and an uncertainty ellipsoid scaled so that the 2D parts are consistent with the Confidence value. The RAN assumes a 3D confidence reporting from the UE. A desired 3D confidence is configured in the CN. The size of the uncertainty ellipse is transformed to be consistent with a 3D value. First Equation (2) is applied to revert the last step of the RAN transformation. Then Equation (2) is applied backwards to revert the first step of the RAN transformation using the (known) received confidence in the RAN from the UE (39% since 2D). The result is a 1-sigma uncertainty ellipsoid. Then Equation (2) is applied backwards to scale the 1-sigma ellipsoid according to the reported confidence value.

e) The UE reports a 3D Confidence and an uncertainty ellipsoid scaled so that the 3D parts are consistent with the Confidence value. The RAN assumes a 3D confidence reporting from the UE. A desired 2D confidence is configured in the CN. The size of the uncertainty ellipse is transformed to be consistent with a 2D value. First Equation (2) is applied to revert the last step of the RAN transformation. The result is a 1-sigma uncertainty ellipsoid. Then Equation (1) is applied backwards to scale the 1-sigma ellipsoid according to the confidence value.

f) The UE reports a 3D Confidence and an uncertainty ellipsoid scaled so that the 3D parts are consistent with the Confidence value. The RAN assumes a 2D confidence reporting from the UE. A desired 2D confidence is configured in the CN. The size of the uncertainty ellipse is transformed to be consistent with a 2D value. First Equation (1) is applied to revert the last step of the RAN transformation. Then Equation (1) is applied backwards to revert the first step of the RAN transformation using the (known) received confidence in the RAN from the UE (20% since 3D). Then Equation (2) is applied backwards to scale the 1-sigma ellipsoid according to the reported confidence value.

g) The UE reports a 3D Confidence and an uncertainty ellipsoid scaled so that the 3D parts are consistent with the Confidence value. The RAN assumes a 2D confidence reporting from the UE. A desired 3D confidence is configured in the CN. The size of the uncertainty ellipse is transformed to be consistent with a 3D value. First Equation (1) is applied to revert the last step of the RAN transformation. Then Equation (1) is applied backwards to revert the first step of the RAN transformation using the (known) received confidence in the RAN from the UE (20% since 3D). Then Equation (2) is applied backwards to scale the 1-sigma ellipsoid according to the confidence value.

h) The UE reports a 3D Confidence and an uncertainty ellipsoid scaled so that the 3D parts are consistent with the Confidence value. The RAN assumes a 3D confidence reporting from the UE. A desired 3D confidence is configured in the CN. No corrective action is necessary Secondly, the case where the confidence is kept constant in the RAN will be described.

The present case is equivalent to a move of the shape conversion confidence scaling functionality, from the RAN to the CN (MSC). Since the RAN forwards the confidence from the UE to the CN without modification, it follows that no restriction to 1-sigma reporting values applies.

1) The UE reports a 2D Confidence and an uncertainty ellipsoid scaled so that the 2D parts are consistent with the Confidence value. A desired 2D confidence is configured in the CN. No corrective action is necessary.

2) The UE reports a 2D Confidence and an uncertainty ellipsoid scaled so that the 2D parts are consistent with the Confidence value. A desired 3D confidence is configured in the CN. The size of the uncertainty ellipse is transformed to be consistent with a 3D value. First Equation (1) is applied to achieve a 1-sigma uncertainty ellipsoid using the reported confidence value. Then Equation (2) is applied backwards to scale the 1-sigma ellipsoid according to the desired confidence value received in the CN.

3) The UE reports a 3D Confidence and an uncertainty ellipsoid scaled so that the 3D parts are consistent with the Confidence value. A desired 2D confidence is configured in the CN. The size of the uncertainty ellipse is transformed to be consistent with a 2D value. First Equation (2) is applied to achieve a 1-sigma uncertainty ellipsoid. Then Equation (1) is applied backwards to scale the 1-sigma ellipsoid according to the confidence value.

4) The UE reports a 3D Confidence and an uncertainty ellipsoid scaled so that the 3D parts are consistent with the Confidence value. A desired 3D confidence is configured in the CN. No corrective action is necessary.

Figure 6:
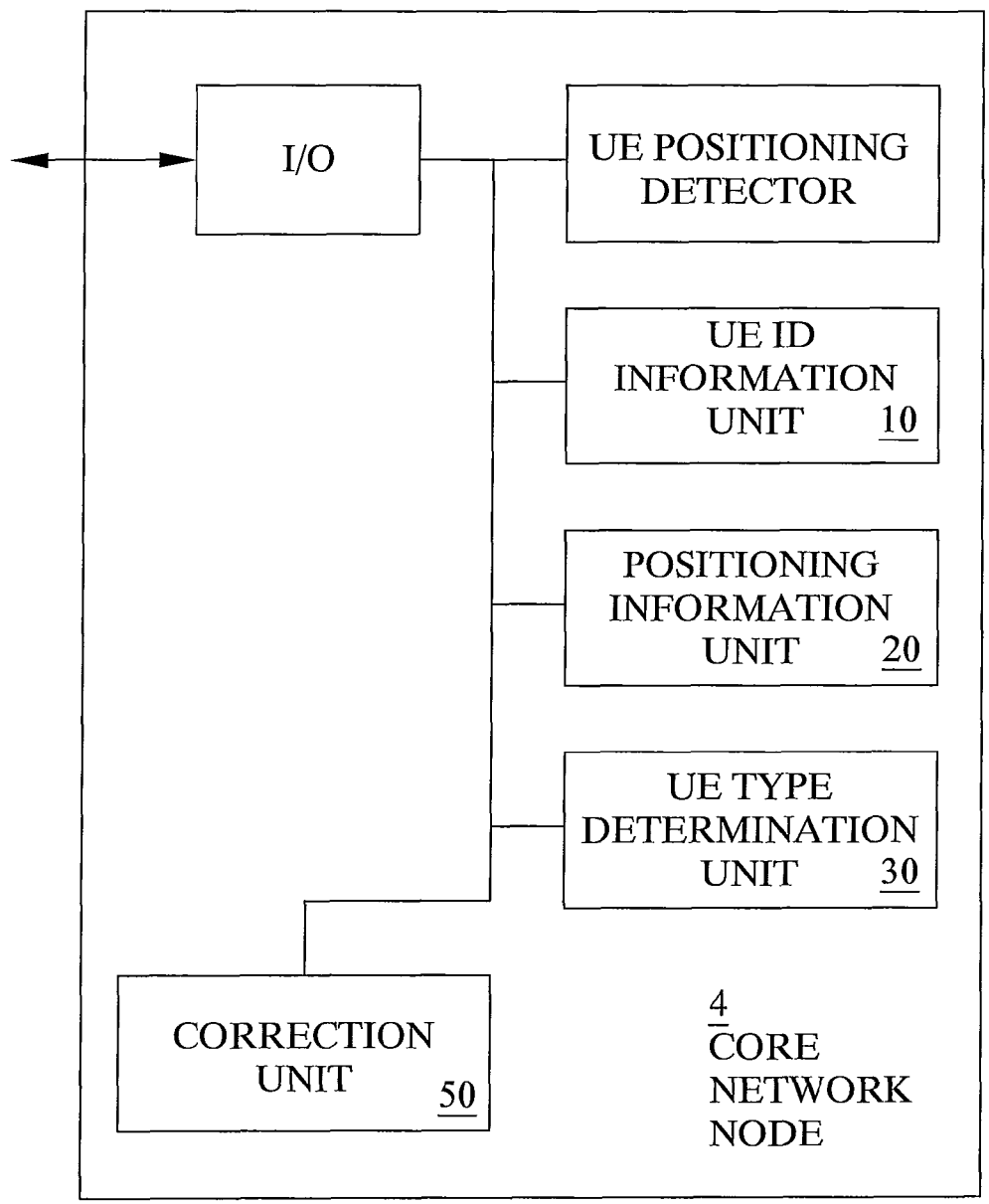
FIG. 6 is a further example of an embodiment of a method according to the present invention.
Figure 6:
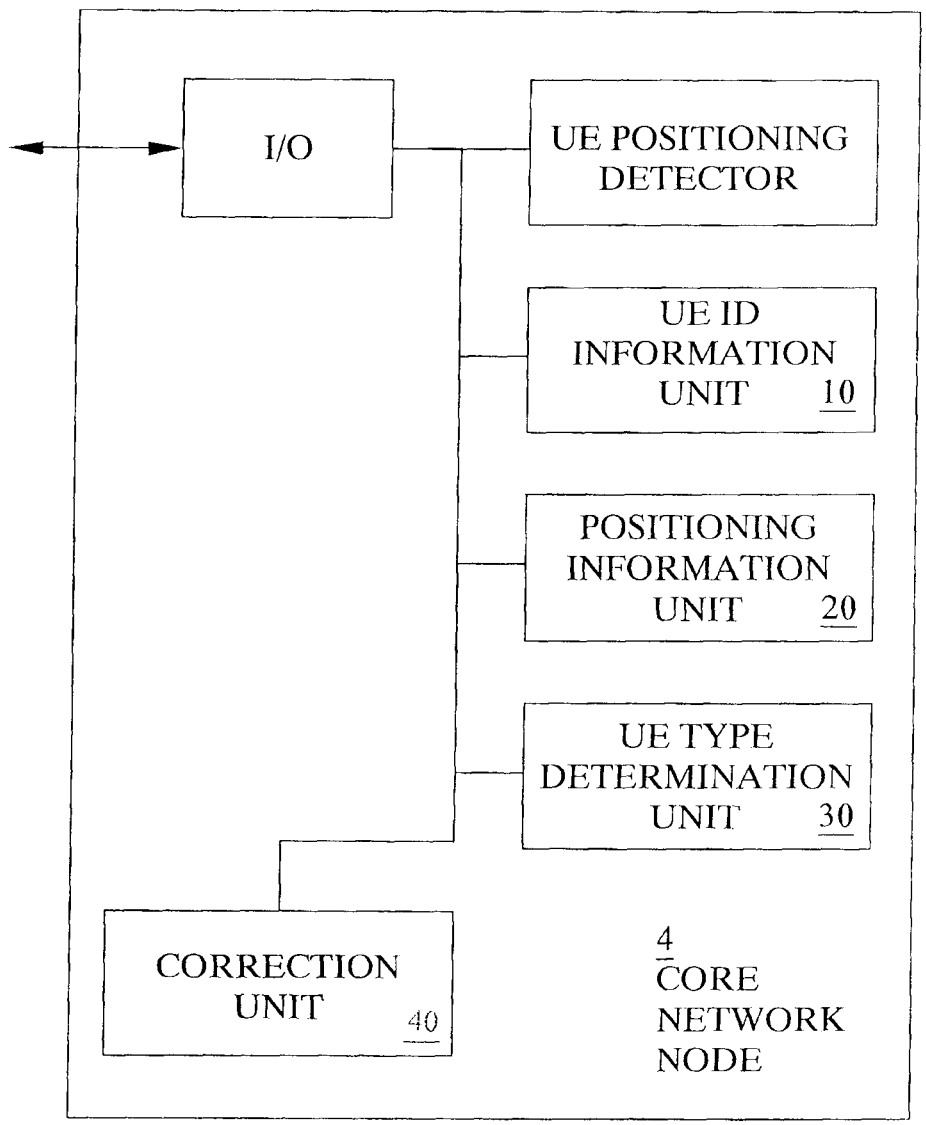

An arrangement to enable the implementation of the embodiments of the method according to the present invention will be described with reference to FIG. 6, it is preferably located in a core network node, e.g. MSC 4. The arrangement is typically implemented in a system as described with reference to FIG. 1, consequently common features will have the same reference numbers. Consequently, the system comprises at least one user equipment UE or terminal 2, in communication with a core network node CN 4 via a radio access network node RAN 3. In the following description the term providing is to be interpreted in a general sense, thus including such actions as receiving and/or transmitting information to and/or from an entity to another.

The above-mentioned arrangement is configured to be responsive to a user equipment positioning event for a user equipment 2 and to perform correction of reported positioning information from said event. Accordingly, the arrangement comprises a unit 10 for providing user equipment identification data to the core network node 4 for each user equipment 2 that has taken part in a positioning event i.e. performed positioning. The data typically includes at least a parameter that indicates a type for the user equipment, for each type at least a geographical reporting format associated with the type, the confidence reporting principle (2D/3D) used by the UE for reporting to the RAN, and the positioning method.

In addition, the arrangement includes a unit 20 for providing positioning information in the core network node 3 from the radio access controller node 3 based on the aforementioned positioning event. The positioning information includes at least a geographical format representative of the geographical position of the user equipment 2, and a positioning method applied in at least the radio network controller node 3.

Further, the arrangement includes a unit 30 for determining the type of the at least one user equipment 2, based on information signaled to the core network node 4. For a specific embodiment, the type determining unit 30 is additionally configured to receive a signal including information concerning the type of the user equipment that is taking part in the positioning event.

Finally, the arrangement includes a unit 40 for correcting/adapting the provided positioning information for the at least one user equipment 2 based on the provided user equipment identification data, a predetermined desired output geographical format, the determined user equipment type and the applied positioning method, whereby an improved positioning for the user equipment is enabled.

The arrangement is preferably located in the core network node, but it is also possible that parts of the functionality for practical reasons are configured in some other node or part of the system. In that context, the term providing for the above-described features is interpreted as receiving for the positioning information unit 20. Consequently, the unit for providing positioning information 20 is configured to receive the information from other nodes, whereas the units for providing user equipment identification data 10 needs to be configured in the node where the functionality resides. However, for a case of the functionality being divided between multiple nodes, the term can be interpreted as transmitting.

In summary, the present invention as compared to the state of the art of location technology, involves all steps and actions defined above, that enable correction or adaptation of inconsistent reporting of uncertainty regions, to comply with different implementation in different UE types, said implementation possibly diverging due to 3GPP standard ambiguities.

The advantages of the present invention include

A correct reporting of positioning uncertainty is achieved, despite ambiguities in the standard. The corrective actions defined resolve the ambiguity in all possible cases.

Diverging implementations of uncertainty reporting in fielded terminals are corrected to the largest possible extent. No modification of terminals is required. No modification of fielded RANs is needed.

The correction is defined in a way that allows for very low complexity implementation in the CN node.

It will be understood by those skilled in the art that various modifications and changes may be made to the present invention without departure from the scope thereof, which is defined by the appended claims.

REFERENCES

[1] TS23.032, Universal Geographical Area Description (GAD), 3GPP
[2] TS 25.331, Radio Resource Control (RRC); Protocol Specification, 3GPP
[3] TS 25.413, UTRAN Iu Interface RANAP Signaling, 3GPP
[4] TS 25.423, UTRAN Iur Interface RNSAP Signaling, 3GPP
[5] TS 24.008, Mobile radio interface Layer 3 specification; Core network protocols, 3GPP

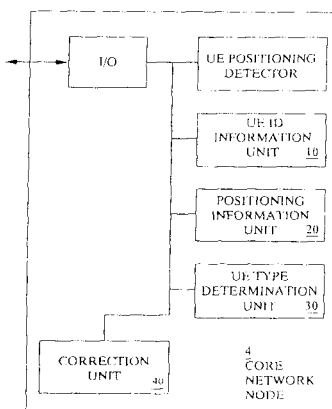

The invention claimed is:

1. A method in a core network node of improved positioning of a user equipment in a telecommunication system, said telecommunication system comprising the user equipment in communication with the core network node via a radio access network node, the method comprising, in response to a user equipment positioning event for said user equipment:
providing user equipment identification data for said user equipment, said user equipment identification data comprising:
at least a parameter indicative of a type for said user equipment;
a confidence reporting principle;
a geographical reporting format comprising a geometrical shape with a size indicative of an uncertainty of a geographical position of said user equipment and a confidence value indicative of a probability that said user equipment is located within said geometrical shape, and wherein at least one parameter is indicative of whether a two dimensional or three dimensional confidence value is provided for said geographical reporting format; and
a positioning method associated with said geographical reporting format;
receiving user equipment positioning information from said radio access network node based on said user equipment positioning event, said user equipment positioning information comprising the geographical reporting format representative of the geographical position of said user equipment, and the positioning method applied;
determining a type of the user equipment based on a received signal including information concerning the type of the user equipment; and
correcting said received user equipment positioning information based on said provided user equipment identification data, a predetermined desired output geographical reporting format, said determined type of user equipment, and said positioning method applied.

2. The method according to claim 1, wherein said provided user equipment identification data is configured in a table in said core network node.

3. The method according to claim 2, wherein receiving positioning information comprises receiving positioning information via said radio access network node.

4. The method according to claim 3, wherein correcting said received user equipment positioning information comprises correcting said received user equipment positioning information if said geographical reporting format and said desired output geographical reporting format correspond to separate dimensional confidence values.

5. The method according to claim 4, wherein if said geographical reporting format corresponds to a two dimensional confidence value, while said desired output geographical reporting format corresponds to a three dimensional confidence value, correcting said received user equipment positioning information comprises applying $$\sqrt{-2\ln(1-P_e)}, b=b'/\sqrt{\sqrt{-2\ln(1-P_e)}}, h=h'/\sqrt{\sqrt{-2\ln(1-P_e)}}$$

to achieve a 1-sigma uncertainty ellipsoid using the confidence value reported by the user equipment, where a' represents a decoded semi-major axis, b' represents a decoded semi-minor axis, h' represents an uncertainty altitude, $P_e$ represents the confidence value, a represents a semi-major axis, b represents a semi minor axis, and h represents the altitude, and applying $$a=a'/\text{scaleFactor3D}, b=b'/\text{scaleFactor3D}, h=h'/\text{scaleFactor3D}$$

backwards to scale the 1-sigma uncertainty ellipsoid according to the confidence value associated with the desired output geographical reporting format, where scaleFactor3D is associated with the confidence value $P_e$ according to a predetermined relation.

6. The method according to claim 4, wherein if said geographical reporting format corresponds to a three dimensional confidence value, while said desired output geographical reporting format corresponds to a two dimensional confidence value, correcting said received user equipment positioning information comprises applying $$a=a'/\text{scaleFactor3D}, b=b'/\text{scaleFactor3D}, h=h'/\text{scaleFactor3D}$$

to achieve a 1-sigma uncertainty ellipsoid, where a' represents a decoded semi-major axis, b' represents a decoded semi-minor axis, h' represents an uncertainty altitude, a represents a semi-major axis, b represents a semi minor axis, h represents the altitude, and scaleFactor3D is associated with the confidence value according to a predetermined relation, and applying $$a=a'/\sqrt{\sqrt{-2\ln(1-P_e)}}, b=b'/\sqrt{\sqrt{-2\ln(1-P_e)}}, h=h'/\sqrt{\sqrt{-2\ln(1-P_e)}}$$

backwards to scale the 1-sigma uncertainty ellipsoid according to the confidence value associated with the desired output geographical reporting format, where $P_e$ represents the confidence value.

7. The method according to claim 1, wherein receiving positioning information comprises receiving an assumed geographical reporting format, said assumed geographical reporting format providing an indication if a two dimensional or three dimensional is reported for all user equipments.

8. The method according to claim 7, wherein correcting said received user equipment positioning information comprises correcting said received user equipment positioning information if only two of said geographical reporting format, said assumed geographical reporting format, and said desired output geographical format correspond to a same dimensional confidence value.

9. The method according to claim 8, wherein correcting said received user equipment positioning information further comprises correcting said received user equipment positioning information based on one of or a combination of:

$$a = a'/\sqrt{-2\ln(1-P_e)}, \; b = b'/\sqrt{-2\ln(1-P_e)}, \; h = h'/\sqrt{-2\ln(1-P_e)}, \quad (1)$$

where a' represents a decoded semi-major axis, b' represents a decoded semi-minor axis, h' represents an uncertainty altitude, $P_e$ represents the confidence value, a represents a semi-major axis, b represents a semi minor axis, and h represents the altitude, and $$a = a''/\text{scaleFactor3D}, \; b = b''/\text{scaleFactor3D}, \; h = h''/\text{scaleFactor3D}, \quad (2)$$

where scaleFactor3D is associated with the confidence value $P_e$ according to a predetermined relation.

10. The method according to claim 9, wherein if said geographical reporting format and said assumed geographical reporting format correspond to a two dimensional confidence value, while said desired output geographical format corresponds to a three dimensional confidence value, correcting said received user equipment positioning information comprises applying Equation 1 to achieve a 1-sigma uncertainty ellipsoid using the confidence value reported by the user equipment, and applying Equation 2 backwards to scale the 1-sigma uncertainty ellipsoid according to the confidence value associated with the desired output geographical reporting format.

11. The method according to claim 9, wherein if said geographical reporting format and said desired output geographical reporting format correspond to a two dimensional confidence value, while said assumed geographical reporting format corresponds to a three dimensional confidence value, correcting said received user equipment positioning information comprises applying Equation 2 to revert the last step of a radio access network transformation, applying Equation 2 backwards to revert the first step of the radio access network transformation using the confidence value in the radio access network node from the user equipment to provide a 1-sigma uncertainty ellipsoid, and applying Equation 1 backwards to scale the 1-sigma uncertainty ellipsoid according to the confidence value associated with the desired output geographical reporting format.

12. The method according to claim 9, wherein if said geographical reporting format corresponds to a two dimensional confidence value, while said assumed geographical reporting format and said desired output geographical reporting format correspond to a three dimensional confidence value, correcting said received user equipment positioning information comprises applying Equation 2 to revert the last step of a radio access network transformation, applying Equation 2 backwards to revert the first step of the radio access network transformation using the confidence value in the radio access network node from the user equipment to provide a 1-sigma uncertainty ellipsoid, and applying Equation 2 backwards to scale the 1-sigma uncertainty ellipsoid according to the confidence value reported by the user equipment.

13. The method according to claim 9, wherein if said geographical reporting format and said assumed geographical reporting format correspond to a three dimensional confidence value, while said desired output geographical reporting format corresponds to a two dimensional confidence value, correcting said received user equipment positioning information comprises applying Equation 2 to revert the last step of a radio access network transformation to provide a 1-sigma uncertainty ellipsoid, and applying Equation 1 backwards to scale the 1-sigma ellipsoid according to the confidence value reported by the user equipment.

14. The method according to claim 9, wherein if said geographical reporting format corresponds to a three dimensional confidence value, while said assumed geographical reporting format and said desired output geographical reporting format correspond to a two dimensional confidence value, correcting said received user equipment positioning information comprises applying Equation 1 to revert the last step of a radio access network transformation, applying Equation 1 backwards to revert the first step of the radio access network transformation using the confidence value in the radio access network node from the user equipment to achieve a 1-sigma uncertainty ellipsoid, and applying Equation 2 backwards to scale the 1-sigma uncertainty ellipsoid according to the confidence value reported by the user equipment.

15. The method according to claim 9, wherein if said geographical reporting format and said desired output geographical reporting format correspond to a three dimensional confidence value, while said assumed geographical reporting format corresponds to a two dimensional confidence value, correcting said received user equipment positioning information comprises applying Equation 1 to revert the last step of a radio access network transformation, applying Equation 1 backwards to revert the first step of the radio access network transformation using the confidence value in the radio access network node from the user equipment to achieve a 1-sigma uncertainty ellipsoid, and applying Equation 2 backwards to scale the 1-sigma uncertainty ellipsoid according to the confidence value reported by the user equipment.

16. The method according to claim 9, wherein if said geographical reporting format corresponds to a two dimensional confidence value, while said desired output geographical reporting format corresponds to a three dimensional confidence value, correcting said received user equipment positioning information comprises applying Equation 1 to achieve a 1-sigma uncertainty ellipsoid using the confidence value reported by the user equipment, and applying Equation 2 backwards to scale the 1-sigma ellipsoid according to the confidence value associated with the desired output geographical reporting format.

17. The method according to claim 9, wherein if said geographical reporting format corresponds to a three dimensional confidence value, while said desired output geographical reporting format corresponds to a two dimensional confidence value, correcting said received user equipment positioning information comprises applying Equation 2 to achieve a 1-sigma uncertainty ellipsoid, and applying Equation 1 backwards to scale the 1-sigma uncertainty ellipsoid according to the confidence value associated with the desired output geographical reporting format.

18. A core network node in a telecommunication system, said system comprising a user equipment in communication with the core network node via a radio access network node, said arrangement being adapted to in response to a user equipment positioning event for said user equipment, said network node comprising:
   a user equipment identification information unit configured to provide user equipment identification data for said user equipment, said user equipment identification data comprising:
      at least a parameter indicative of a type for said user equipment;

a confidence reporting principle;

a geographical reporting format comprising a geometrical shape with a size indicative of an uncertainty of a geographical position of said user equipment and a confidence value indicative of a probability that said user equipment is located within said geometrical shape, and wherein at least one parameter is indicative of whether a two dimensional or three dimensional confidence value is provided for said geographical reporting format; and a positioning method, associated with said geographical reporting format;

a positioning information unit configured to receive user equipment positioning information from said radio access network node based on said user equipment positioning event, said user equipment positioning information comprising the geographical reporting format representative of the geographical position of said user equipment, and the positioning method applied;

a user equipment type determination unit configured to determine the type of said user equipment, based on a received signal including information concerning the type of the user equipment; and a correction unit configured to correct said provided user equipment positioning information for said user equipment based on said provided user equipment identification data, a predetermined desired output geographical reporting format, said determined type of user equipment, and said positioning method applied.

* * * * *

UNITED STATES PATENT AND TRADEMARK OFFICE
CERTIFICATE OF CORRECTION

PATENT NO. : 8,385,948 B2
APPLICATION NO. : 13/140672
DATED : February 26, 2013
INVENTOR(S) : Wigren et al.

It is certified that error appears in the above-identified patent and that said Letters Patent is hereby corrected as shown below:

Delete the title page and substitute the attached title page therefor.

In the Drawings:

Delete Sheet 6 of 6, and substitute the attached Sheet 6 of 6 therefor.

In the Specifications:

In Column 3, Line 18, delete "WCDM" and insert -- WCDMA --, therefor.

In Column 3, Line 18, delete "Access" and insert -- Access. --, therefor.

In Column 3, Line 31, delete "e.g" and insert -- e.g. --, therefor.

In Column 3, Line 38, delete "RNC" and insert -- RNC. --, therefor.

In Column 7, Lines 30-31, in Equation (1), delete " $a=a'/\sqrt{-2\ln(1-P_e)}, b=b'/\sqrt{-2\ln(1-P_e)}, h=h'/\sqrt{-2\ln(1-P_e)}$ " and insert -- $a=a'/\sqrt{-2\ln(1-P_e)}, b=b'/\sqrt{-2\ln(1-P_e)}, h=h'/\sqrt{-2\ln(1-P_e)}$ --, therefor.

In Column 7, Line 34, delete "semi minor" and insert -- semi-minor --, therefor at each occurrence throughout the patent.

In Column 9, Line 39, delete "'necessary" and insert -- necessary. --, therefor.

In Column 10, Line 32, delete "3" and insert -- 4 --, therefor.

Signed and Sealed this
Fourth Day of June, 2013

Teresa Stanek Rea
*Acting Director of the United States Patent and Trademark Office*

CERTIFICATE OF CORRECTION (continued)
U.S. Pat. No. 8,385,948 B2

In Column 11, Line 31, delete "3GPP" and insert -- 3GPP. --, therefor.

In the Claims:

In Column 12, Line 22, in Claim 5, delete "$\sqrt{-2\ln(1-P_e)},$" and insert -- $a = a'/\sqrt{-2\ln(1-P_e)},$ --, therefor.

In Column 12, Line 22, in Claim 5, delete "$b=b'/\sqrt{-2\ln(1-P_e)}, h=h'/\sqrt{-2\ln(1-P_e)}$" and insert -- $b=b'/\sqrt{-2\ln(1-P_e)}, h=h'/\sqrt{-2\ln(1-P_e)}$ --, therefor.

In Column 12, Lines 53-54, in Claim 6, delete "$a=a'/\sqrt{-2\ln(1-P_e)}, b=b'/\sqrt{-2\ln(1-P_e)}, h=h'/\sqrt{-2\ln(1-P_e)}$" and insert -- $a=a'/\sqrt{-2\ln(1-P_e)}, b=b'/\sqrt{-2\ln(1-P_e)}, h=h'/\sqrt{-2\ln(1-P_e)}$ --, therefor.

In Column 13, Lines 9-10, in Claim 9, Equation (1), delete "$a=a'/\sqrt{-2\ln(1-P_e)}, b=b'/\sqrt{-2\ln(1-P_e)}, h=h'/\sqrt{-2\ln(1-P_e)}$" and insert -- $a=a'/\sqrt{-2\ln(1-P_e)}, b=b'/\sqrt{-2\ln(1-P_e)}, h=h'/\sqrt{-2\ln(1-P_e)}$ --, therefor.

In Column 13, Line 30, in Claim 10, delete "2backwards" and insert -- 2 backwards --, therefor.

(12) United States Patent
Wigren et al.

(10) Patent No.: US 8,385,948 B2
(45) Date of Patent: Feb. 26, 2013

(54) METHOD AND ARRANGEMENT FOR IMPROVED POSITIONING

(75) Inventors: Karl Torbjörn Wigren, Uppsala (SE); Bo Hellander, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 3 days.

(21) Appl. No.: 13/140,672

(22) PCT Filed: Dec. 18, 2008

(86) PCT No.: PCT/SE2008/051512
§ 371 (c)(1),
(2), (4) Date: Sep. 2, 2011

(87) PCT Pub. No.: WO2010/071518
PCT Pub. Date: Jun. 24, 2010

(65) Prior Publication Data
US 2011/0306355 A1 Dec. 15, 2011

(51) Int. Cl.
*H04Q 7/20* (2006.01)
(52) U.S. Cl. ............... 455/457; 455/456.5; 455/456.1; 342/357.2
(58) Field of Classification Search ............ 455/457, 455/456.5, 456.1; 342/357.2
See application file for complete search history.

(56) References Cited

U.S. PATENT DOCUMENTS

| | | | |
|---|---|---|---|
| 6,549,781 B1 * | 4/2003 | O'Byrne et al. | 455/446 |
| 6,768,994 B1 * | 7/2004 | Howard et al. | 1/1 |
| 2003/0109267 A1 * | 6/2003 | Bulut | 455/457 |
| 2003/0117316 A1 * | 6/2003 | Tischer | 342/357.1 |
| 2003/0216142 A1 * | 11/2003 | Wigren | 455/456.1 |
| 2010/0075696 A1 * | 3/2010 | Wigren | 455/456.1 |

(Continued)

FOREIGN PATENT DOCUMENTS
WO 2004/019650 A1 3 2004

(Continued)

OTHER PUBLICATIONS
3RD Generation Partnership Project, "Positioning Reporting Inconsistencies," TSG-RAN Working Group 3 Meeting #44, Tdoc R3-041332, Sophia Antipolis, France, Oct. 4-8, 2004.

(Continued)

*Primary Examiner* — Danh Le
(74) *Attorney, Agent, or Firm* — Coats & Bennett, P.L.L.C.

(57) ABSTRACT

In a method of improved positioning of user equipments in a telecommunication system comprising at least one user equipment in communication with a core network node via a radio access network node, in response to a user equipment positioning event for said at least one user equipment performing the following steps. Providing S10 user equipment identification data in the core network node for each at least one user equipment, the data comprising at least a parameter indicative of a type for the user equipment, a confidence reporting principle, a geographical reporting format type, and a positioning method, associated with said user equipment type. Providing S20 positioning information in the core network node from the radio access network node based on the positioning event. The positioning information comprising a geographical format representative of the geographic position of the user equipment, and a positioning method applied in at least the radio network node. Subsequently, determining S30 the type of the at least one user equipment, from information signaled to the core network node. Finally, correcting/adapting S40 the provided positioning information based on the provided user equipment identification data, a predetermined desired output geographical format, the determined user equipment type and the applied positioning method, whereby an improved positioning for the user equipment is enabled in the core network node.

18 Claims, 6 Drawing Sheets